(12) United States Patent
Lee et al.

(10) Patent No.: US 9,744,626 B2
(45) Date of Patent: Aug. 29, 2017

(54) APPARATUS FOR CHANGING WELDING TIP

(71) Applicant: KOREA T&M CO., LTD., Ulju-gun, Ulsan (KR)

(72) Inventors: Seung-Hae Lee, Ulsan (KR); Du-Hyeon Song, Ulsan (KR); Joo-Hyun Lee, Pohang-si (KR)

(73) Assignee: KOREA T&M CO. LTD., Ulju-gun, Ulsan (KR)

( * ) Notice: Subject to any disclaimer, the term of this patent is extended or adjusted under 35 U.S.C. 154(b) by 298 days.

(21) Appl. No.: 14/387,710

(22) PCT Filed: Feb. 12, 2014

(86) PCT No.: PCT/KR2014/001140
§ 371 (c)(1),
(2) Date: Sep. 24, 2014

(87) PCT Pub. No.: WO2014/126381
PCT Pub. Date: Aug. 21, 2014

(65) Prior Publication Data
US 2015/0038306 A1    Feb. 5, 2015

(30) Foreign Application Priority Data
Feb. 13, 2013 (KR) ........................ 10-2013-0015218

(51) Int. Cl.
*B23K 11/30*    (2006.01)
*B23K 11/36*    (2006.01)
(Continued)

(52) U.S. Cl.
CPC .......... *B23K 37/00* (2013.01); *B23K 11/3072* (2013.01); *B23K 11/36* (2013.01);
(Continued)

(58) Field of Classification Search
CPC ............ B23K 11/3072; B23K 11/3063; Y10T 483/17; B23Q 3/155–3/15793
(Continued)

(56) References Cited

U.S. PATENT DOCUMENTS 4,794,221 A * 12/1988 Takabe ............... B23K 11/3072
219/86.1
5,734,141 A * 3/1998 Voilmy .............. B23K 11/3072
483/16
(Continued)

FOREIGN PATENT DOCUMENTS

DE      102013012590 A1 *   4/2014
EP         867253 A1 *   9/1998
(Continued)

*Primary Examiner* — Erica E Cadugan
(74) *Attorney, Agent, or Firm* — R. Neil Sudol; Henry D. Coleman

(57) ABSTRACT

An apparatus for interchanging welding tips of a spot welding gun. The apparatus replaces a welding tip installed in a robot arm and includes welding tip removal componentry combined with the robot arm, welding tip mounting structure combined with one side of the welding tip removal componentry, and a welding tip supply spaced apart from the welding gun at a specific distance and configured to supply a welding tip to the welding tip mounting componentry.

11 Claims, 9 Drawing Sheets

(51) Int. Cl.
*B23Q 3/155* (2006.01)
*B23Q 17/00* (2006.01)
*B23K 37/00* (2006.01)

(52) U.S. Cl.
CPC ..... *B23Q 3/15526* (2013.01); *B23Q 3/15573* (2013.01); *B23Q 17/00* (2013.01); *Y10T 483/136* (2015.01); *Y10T 483/17* (2015.01)

(58) Field of Classification Search
USPC .......................................... 219/86.8; 483/16
See application file for complete search history.

(56) References Cited

U.S. PATENT DOCUMENTS

| | | | | |
|---|---|---|---|---|
| 6,667,454 B2* | 12/2003 | Rigaux | .............. | B23K 11/3072 219/86.8 |
| 7,353,578 B2* | 4/2008 | Nakajima | .......... | B23K 11/3072 29/238 |
| 2015/0020382 A1* | 1/2015 | Lee | ................... | B23K 11/3072 29/729 |
| 2015/0217397 A1* | 8/2015 | Nakajima | .......... | B23K 11/3063 29/50 |

FOREIGN PATENT DOCUMENTS

| | | |
|---|---|---|
| JP | 63-085387 U | 6/1998 |
| KR | 10-0829476 B1 | 5/2008 |
| KR | 10-2010-0024276 A | 3/2010 |
| KR | 10-1216192 | 12/2012 |
| WO | WO-2015/178643 A1 * | 11/2015 |

* cited by examiner

PRIOR ART

[a]  [b]  [c]

Bending and Measuring Sensor for Checking a Bending State of the Tip of the Shank 12 of the Welding Gun 10 Installed In At Least One of the Welding Tip Removal Means 110 and the Welding Tip Mounting Means 140

APPARATUS FOR CHANGING WELDING TIP

CROSS-REFERENCE TO RELATED APPLICATION

This Application is a Section 371 National Stage Application of International Application No. PCT/KR2014/001140, filed on Feb. 12, 2014, the contents of which are hereby incorporated by reference in its entirety.

BACKGROUND OF THE INVENTION

Technical Field

The present invention relates to an apparatus for replacing a welding tip. More particularly, the present invention relates to an apparatus for replacing a welding tip, which is capable of automatically changing the welding tip of a spot welding gun.

Background Art

In general, in quantity production for a specific product as in a vehicle product line, spot welding in which a welding part has high stability is chiefly used because the heating time is very short and working speed is fast compared to other welding and residual stress or deformation is small due to a narrow heating range.

Spot welding is welding in which point bonding is performed on a sheet without perforating a hole in the sheet, such as a riveted joint, by generating melting in contact parts using the generation of heat according to electric resistance and bonding the contact parts using pressure.

Spot welding is performed in the state in which a welding gun is mounted on a robot or mounted on a frame installed on the ground. The welding gun includes a body in which a timer, a contactor, a transformer, etc. for welding are embedded, two shanks 1 facing each other, one of which is installed on one end of a lower arm fixed to the lower part of the body and the other of which is installed on one end of an upper arm rotatably installed in the upper part of the body by a hinge shaft, and welding tips 2 which are attached to the respective shanks 1 and at which welding is performed.

FIG. 1 is a diagram illustrating a conventional method of changing the tip of a robot welding gun.

In order to change the tip of a welding gun used in a current vehicle body manufacturing plant for vehicles, the tip is changed using a tool as illustrated in FIG. 1.

That is, in order to change a welding tip, a worker separates the welding tip 2 from the shank 1 of the welding gun using a pipe wrench or a tip-dedicated tool. Furthermore, a worker mounts a new welding tip using a tool, checks the new welding tip, and checks the state of the new welding tip.

When such a welding tip change task is performed, the time taken to replace the welding tip is relatively long because a worker enters the manufacturing line and directly changes the welding tip in a non-operation time.

Furthermore, if a welding tip needs to be replaced when a vehicle body product line operates, the operation must be stopped while a worker replaces the welding tip. Accordingly, there are problems in that productivity is reduced due to this kind of non-operation time and personal expenses attributable to working hours are increased.

Furthermore, the prior art is problematic in that welding quality is deteriorated because the tip of the shank combined with the welding tip is deformed by external force that is generated when the welding tip is separated from the shank of the welding gun using a tool.

DISCLOSURE

Technical Problem

Accordingly, the present invention has been made to solve the problems, and an object of the present invention is to provide an apparatus for replacing a welding tip, which is capable of improving workability and productivity and preventing a safety accident by automatically replacing the welding tip of a spot welding gun.

Technical Solution

In order to achieve the above and other objects of the present invention, in accordance with an embodiment of the present invention, there is provided an apparatus for replacing the welding tip of a spot welding gun, including welding tip removal means combined with the robot arm, welding tip mounting means combined with one side of the welding tip removal means, and welding tip supply means spaced apart from the welding gun at a specific interval and configured to supply a welding tip to the welding tip mounting means.

The welding tip removal means is configured to include a cylinder combined with one side of the robot arm, a housing combined with the top of the cylinder and configured to have an incision groove formed on one side in the length direction of the housing, a shaft configured to have one end combined with the cylinder and the other end externally protruded from the housing in such a way as to slide within the housing and to include a body configured to have a protrusion part protruded and formed at a specific location of the body and first and second extension units in parallel extended and formed from the body so that each of the first and second extension units has a different length and has an incision part, a clamp inserted into the incision groove so that the clamp is elastically moved in the height direction of the housing by an elastic member provided at a specific location within the housing, covers combined with one side of the housing in which the incision groove is formed so that the clamp does not deviate from the incision groove, and a guide unit configured to include a guide body configured to have a bottom combined with a top surface of the housing and to include an insertion unit inserted into the incision part included in the first extension unit and a guide bracket combined with both sides of the guide body. A welding tip insertion groove is formed at the center of the insertion unit, the guide body corresponding to the insertion unit, and the center of the guide bracket.

A pair of guide projections is downward slantly protruded and formed on both sides of the incision part.

A fitting unit is protruded and formed at the lower part of the clamp, and the protrusion part selectively presses the fitting unit when the shaft slides so that elastic force is applied to the clamp by the elastic member.

The welding tip mounting means is configured to include a housing combined with one side of the welding tip removal means, a cylinder combined with the end of the housing, and a finger unit provided within the housing and driven by the cylinder.

The finger unit is configured to include a combination tool placed within the housing and configured to have one end combined with the cylinder, a connection tool combined with the other end of the combination tool so that one end of the connection tool is rotatably moved, an actuation finger configured to have one end rotatably combined with the other end of the connection tool and to have a central part hinged and combined with a specific location within the housing, and a fixation finger combined with a specific location within the housing so that the fixation finger is placed under the actuation finger.

A guide groove is formed a specific location on one side of the housing, and the combination tool moves along the guide groove in conjunction with the operation of the cylinder.

The welding tip supply means includes a post frame spaced apart from the welding gun at a specific interval, a body combined with the top of the post frame and configured to include a welding tip accommodation unit and a welding tip input hole, and covers combined with both sides of the body, and a welding tip collection tank is installed at a specific location in the height direction of the post frame.

A miss-input prevention unit for preventing the welding tip from being input to the welding tip accommodation unit through the welding tip input hole when an input direction of the welding tip supplied to the welding tip accommodation unit through the welding tip input hole is reversed is formed on one side of the welding tip input hole.

An auxiliary welding tip supply unit for supplying a welding tip to the welding tip supply means is disposed on top of the welding tip supply means. The auxiliary welding tip supply unit is configured to include a body configured to have a welding tip storage unit formed in the body in the height direction, an opening formed at a specific location of the body in such a way as to communicate with the welding tip storage unit, an opening and closing lever rotatably combined with an incision part formed in the length direction at the bottom of the body from the opening and configured to open and close the opening, and covers combined with both sides of the body.

A bending measuring sensor for checking the bending state of the tip of the shank of the welding gun is installed in at least one of the welding tip removal means and the welding tip mounting means.

Advantageous Effect

In accordance with the present invention having the aforementioned construction, there are advantages in that workability and productivity can be improved and a safety accident can be prevented because the welding tip of a spot welding gun can be automatically replaced.

DESCRIPTION OF THE REFERENCE NUMERALS IN THE DRAWINGS

Figure 1:
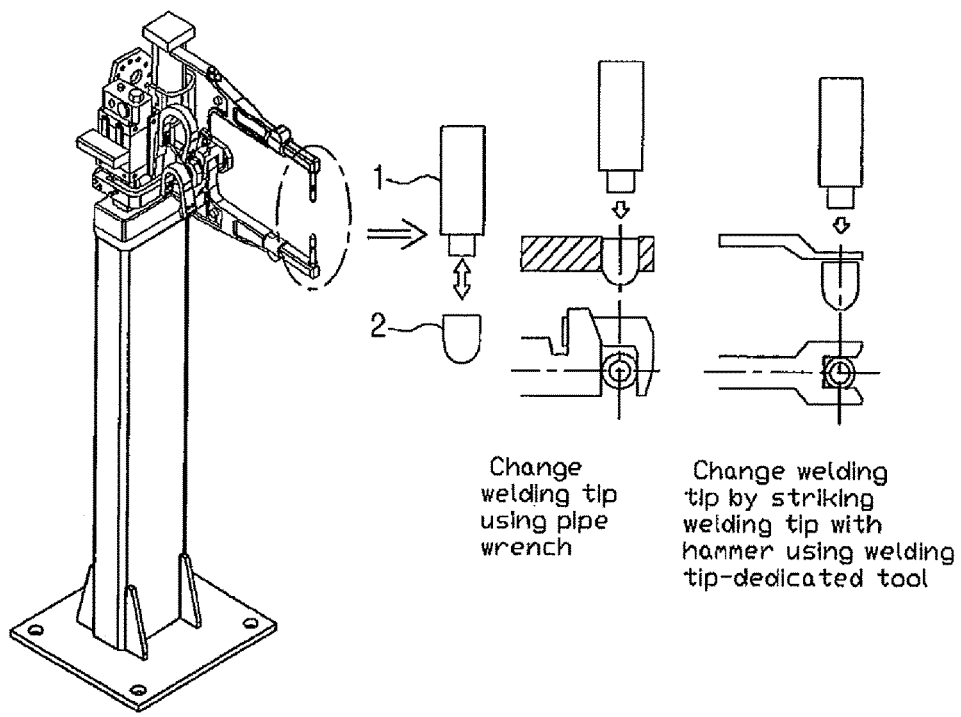
FIG. 1 is a diagram illustrating a conventional method for replacing the tip of a robot welding gun.

| | |
|---|---|
| 110: welding tip removal means | |
| 170: auxiliary welding tip supply unit | |
| 112: cylinder | 172: body |
| 116: shaft | 174: opening |
| 118: body | 176: incision part |
| 120: first extension unit | |
| 178: opening and closing lever | |
| 122: second extension unit | 179: cover |
| 124: clamp | 190: bending measuring sensor |
| 126: elastic member | 192: connection plate |
| 128: cover | 194: casing |
| 130: guide unit | 196: guide |
| 140: welding tip mounting means | |
| 198: spring plungers | 142: housing |
| 144: cylinder | 146: finger unit |
| 148: combination tool | 150: connection tool |
| 152: actuation finger | 154: fixation finger |
| 160: welding tip supply means | |

PREFERRED EMBODIMENTS OF THE INVENTION

Hereinafter, preferred embodiments of the present invention are described in more detail with reference to the accompanying drawings. The thickness of lines and the size of elements illustrated in the drawings may have been enlarged for the clarity of descriptions and for convenience' sake.

Furthermore, terms to be described later are defined by taking into consideration the functions of the embodiments of the present invention, and may be different according to the operator's intention or usage. Accordingly, the terms should be defined based on the overall contents of the specification.

Figure 2:
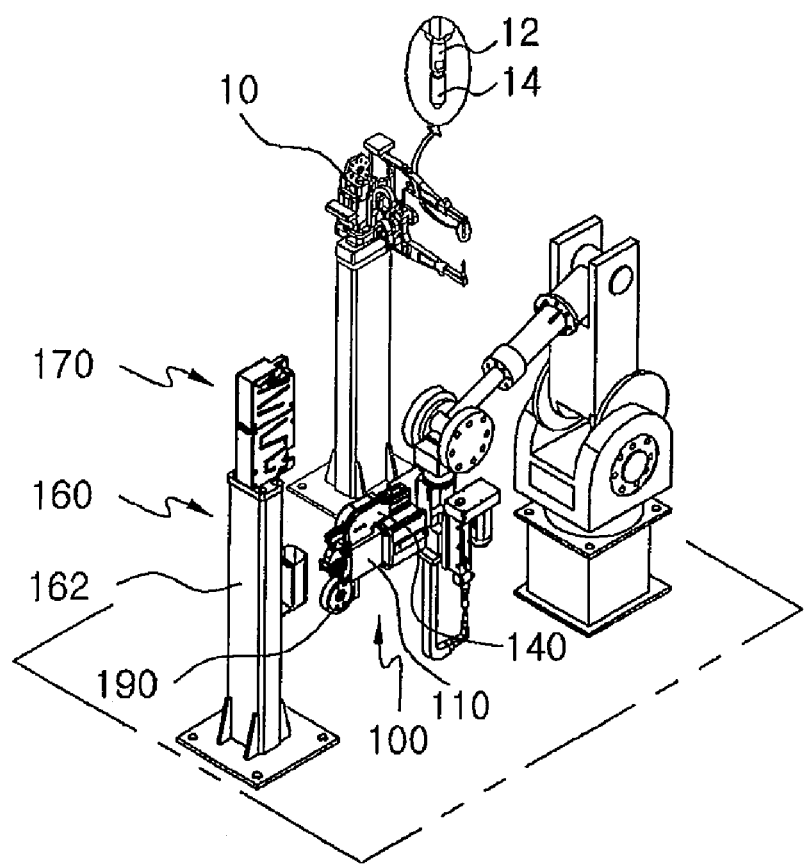
FIG. 2 is a perspective view of an apparatus for replacing a welding tip in accordance with an embodiment of the present invention.
Figure 3:
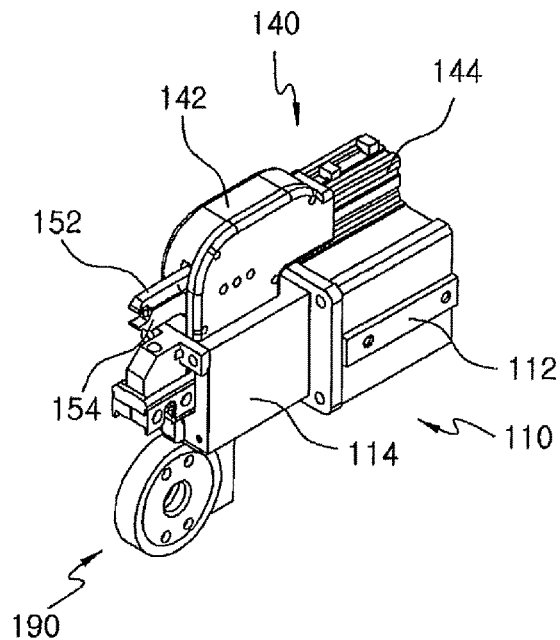
FIG. 3 is a perspective view of welding tip removal means and welding tip mounting means illustrated in FIG. 2.
Figure 4:
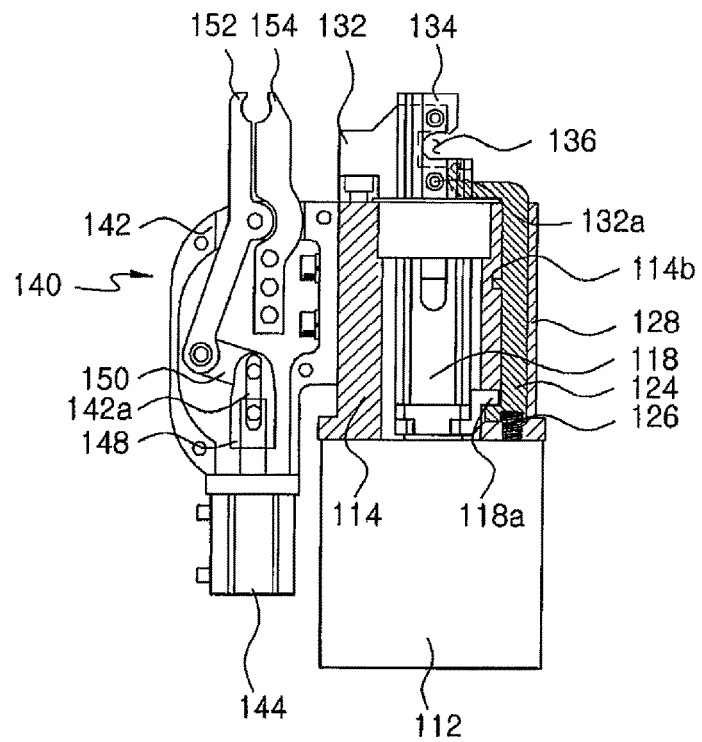
FIG. 4 is a cross-sectional view of the welding tip removal means and the welding tip mounting means illustrated in FIG. 3.
Figure 5:
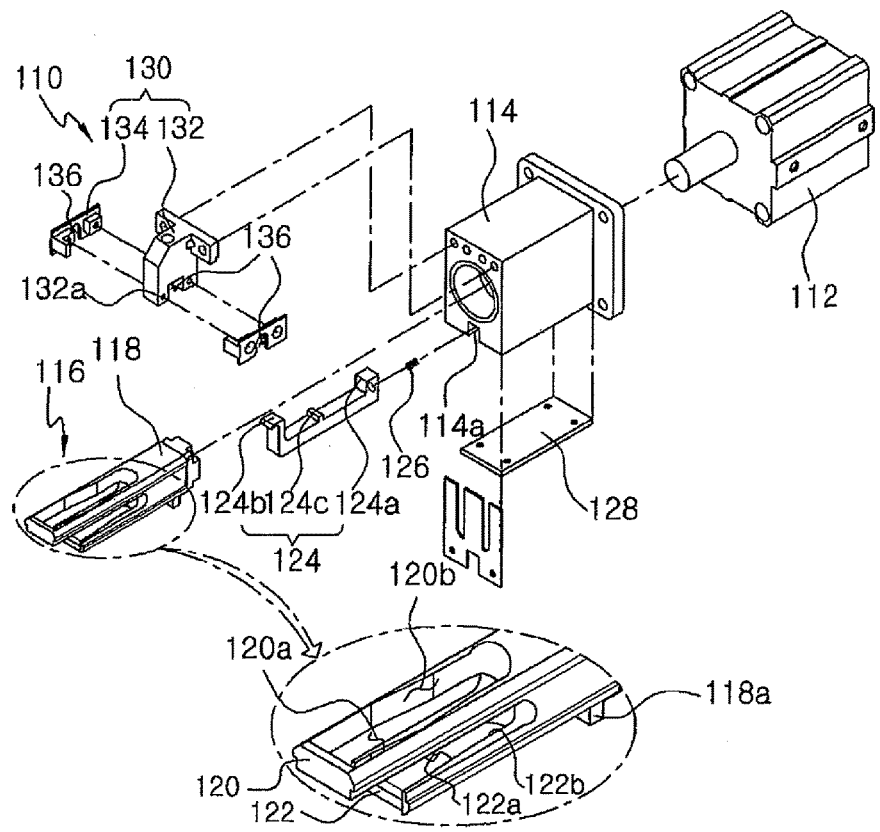
FIG. 5 is an exploded perspective view of the welding tip removal means illustrated in FIG. 3.
Figure 6:
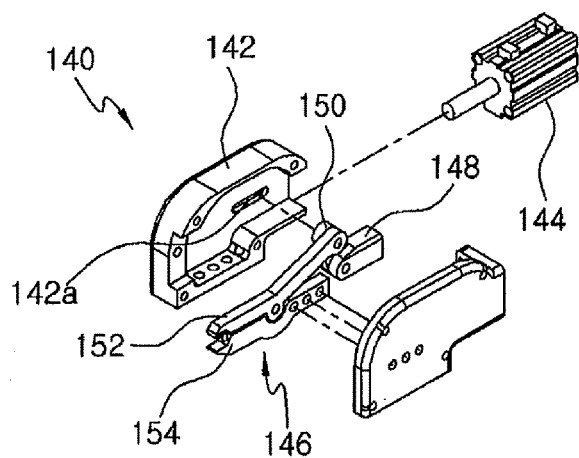
FIG. 6 is an exploded perspective view of the welding tip mounting means illustrated in FIG. 3.
Figure 7:
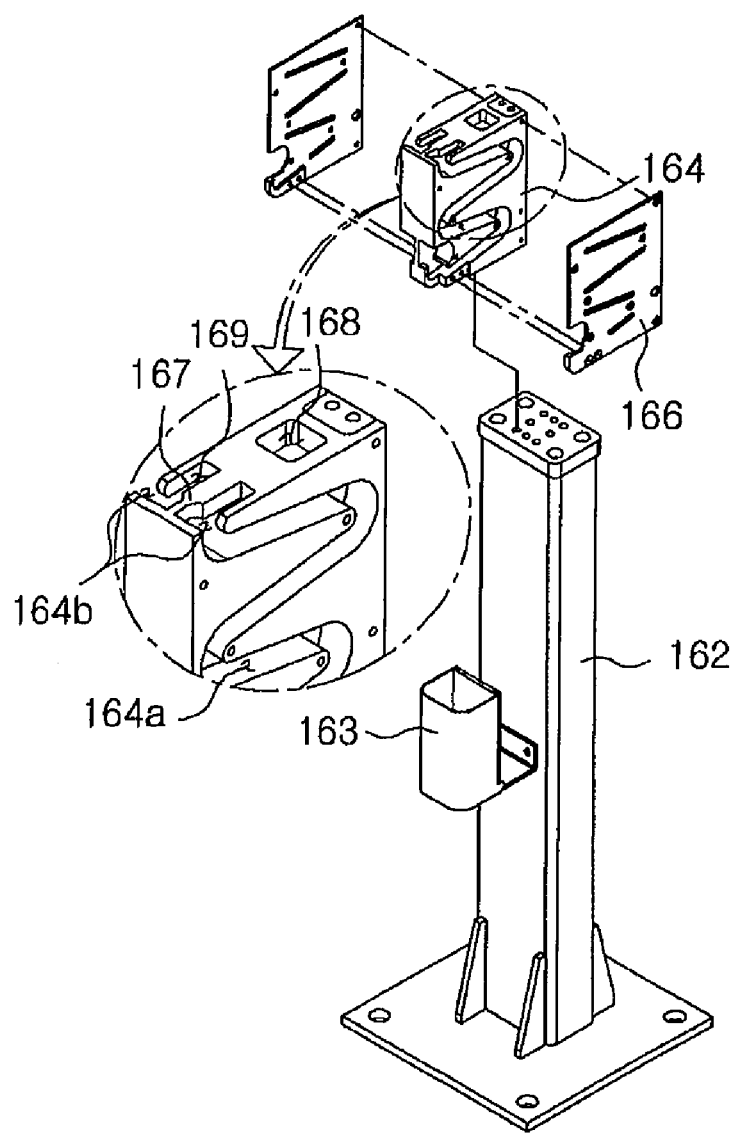
FIG. 7 is an exploded perspective view of welding tip supply means illustrated in FIG. 2.
Figure 8:
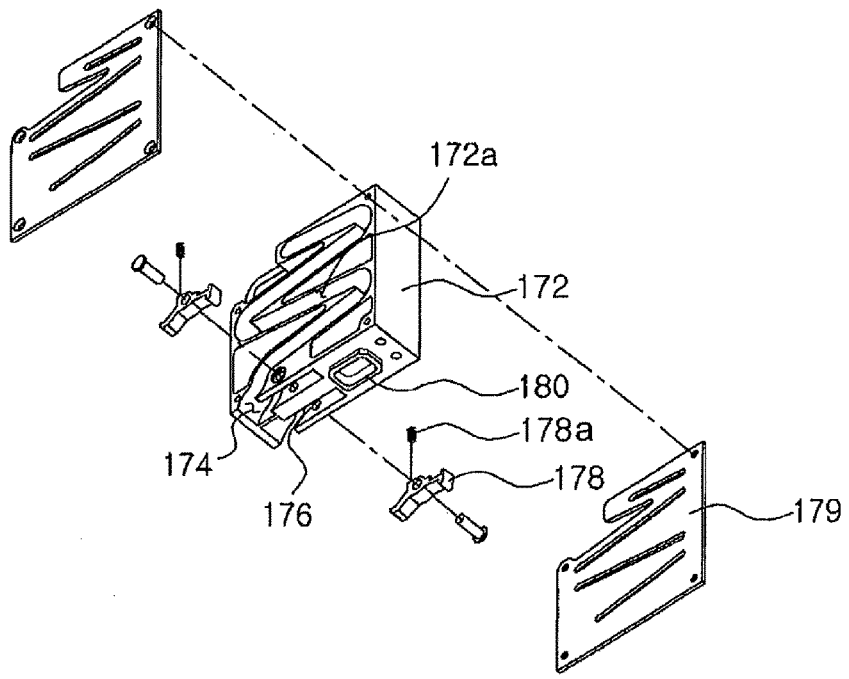
FIG. 8 is an exploded perspective view of auxiliary welding tip supply unit illustrated in FIG. 2.
Figure 9:
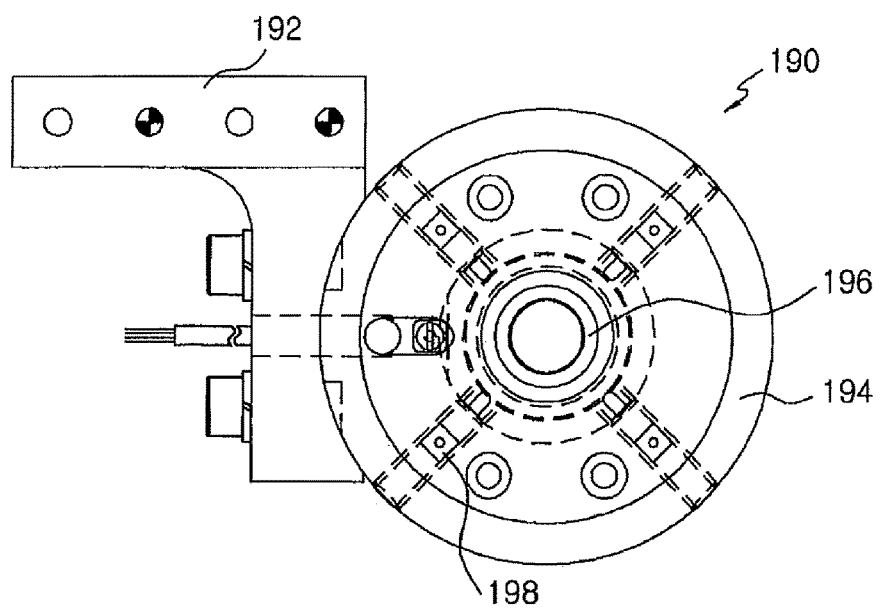
FIG. 9 is a plan view of a bending measuring sensor illustrated in FIG. 2.
Figure 10:
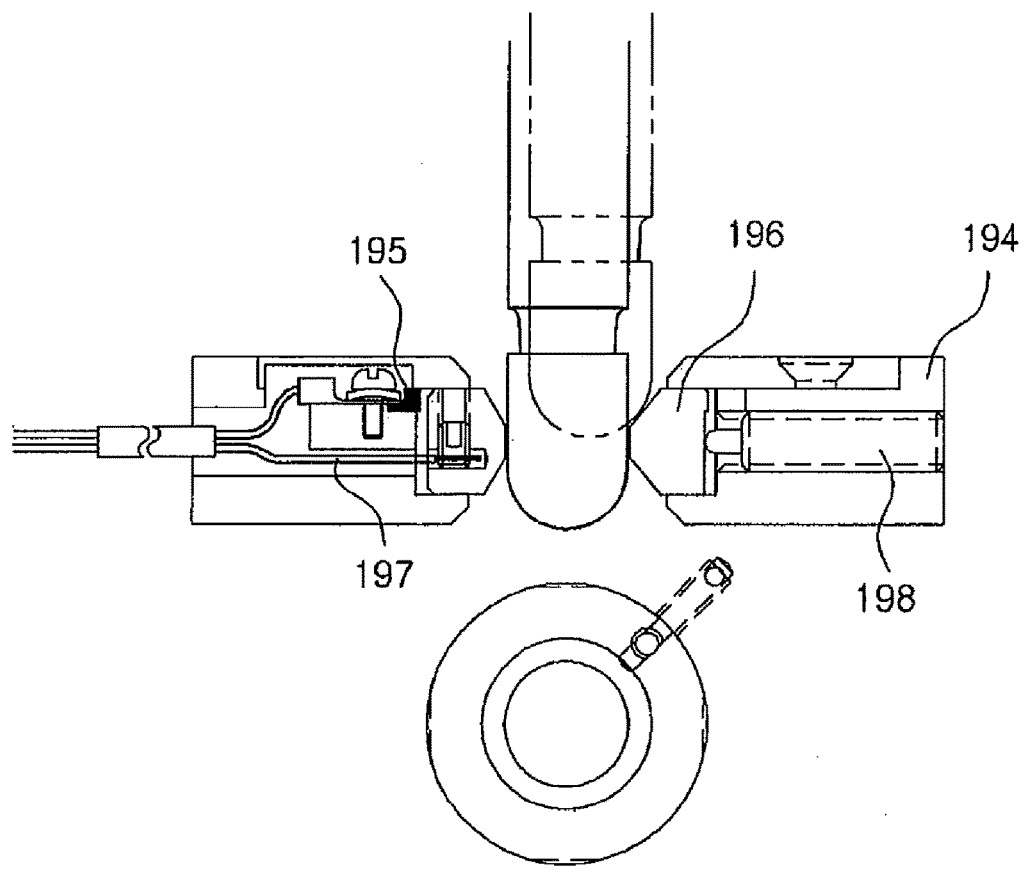
FIG. 10 is a state diagram in which the bending measuring sensor illustrated in FIG. 9 is driven.
Figure 11:
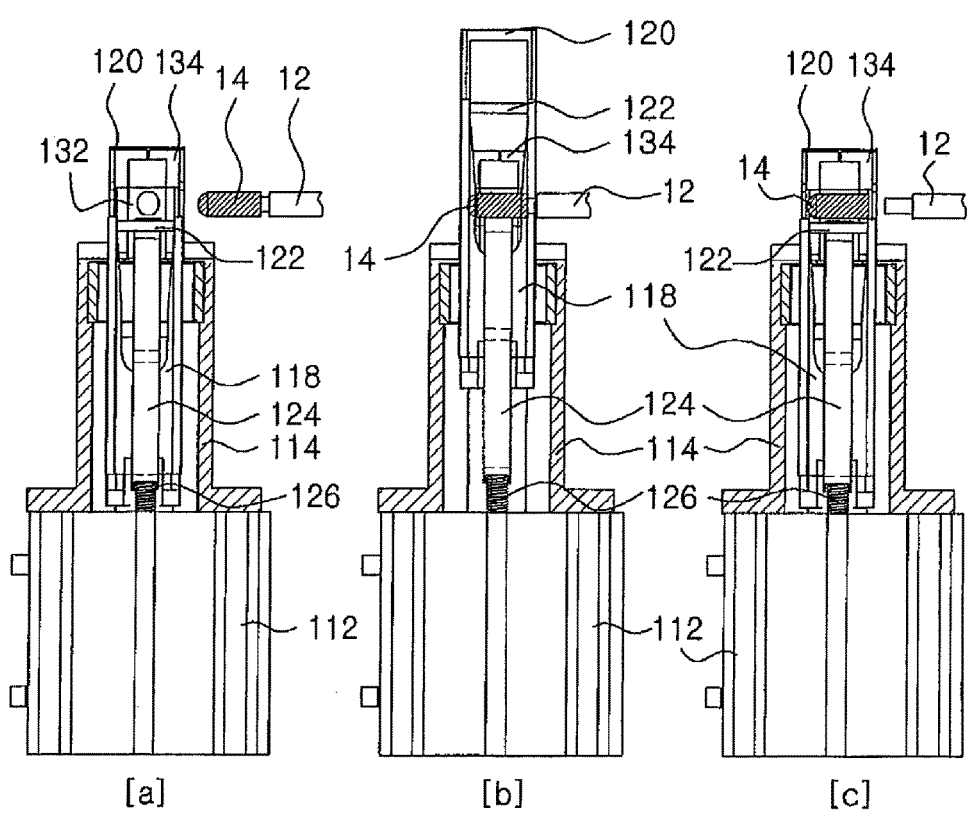
FIG. 11 is a diagram schematically illustrating an operation of removing a welding tip by the welding tip removal means in accordance with an embodiment of the present invention.
Figures 12, 13:
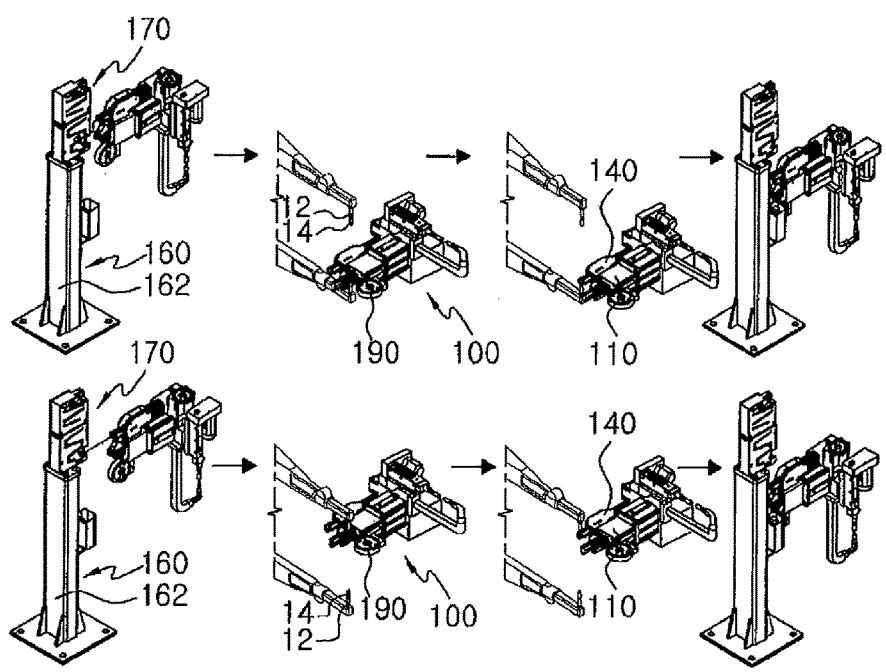
FIG. 12 is a state diagram in which the apparatus for replacing a welding tip operates in accordance with an embodiment of the present invention.
FIG. 13 is a block diagram of a bending measuring sensor shown in FIG. 9.

FIG. 2 is a perspective view of an apparatus for replacing a welding tip in accordance with an embodiment of the present invention, FIG. 3 is a perspective view of welding tip removal means and welding tip mounting means illustrated in FIG. 2, FIG. 4 is a cross-sectional view of the welding tip removal means and the welding tip mounting means illustrated in FIG. 3, FIG. 5 is an exploded perspective view of the welding tip removal means illustrated in FIG. 3, FIG. 6 is an exploded perspective view of the welding tip mounting means illustrated in FIG. 3, FIG. 7 is an exploded perspective view of welding tip supply means illustrated in FIG. 2, FIG. 8 is an exploded perspective view of auxiliary welding tip supply unit illustrated in FIG. 2, FIG. 9 is a plan view of a bending measuring sensor illustrated in FIG. 2, FIG. 10 is a state diagram in which the bending measuring sensor illustrated in FIG. 9 is driven, FIG. 11 is a diagram schematically illustrating an operation of removing a welding tip by the welding tip removal means in accordance with an embodiment of the present invention, and FIG. 12 is a state diagram in which the apparatus for replacing a welding tip operates in accordance with an embodiment of the present invention.

Referring to FIGS. 2 to 12, the apparatus 100 for replacing a welding tip in accordance with an embodiment of the present invention includes a robot arm for replacing the welding tip of a welding gun 10 installed on the ground.

Such an apparatus 100 for replacing a welding tip is configured to include welding tip removal means 110 combined with the robot arm, welding tip mounting means 140 combined with one side of the welding tip removal means 110, and welding tip supply means 160 separated from the welding gun 10 at a specific interval and configured to supply a welding tip to the welding tip mounting means 140.

The welding tip removal means 110 is configured to include a cylinder 112, a housing 114, a shaft 116, a clamp 124, a covers 128, and a guide unit 130.

The cylinder 112 is combined with one side of the robot arm and configured to drive the shaft 116 to be described later.

The housing 114 is combined with the top of the cylinder 112 and configured to have an incision groove 114a formed on one side in the length direction of the housing.

The shaft 116 has one end combined with the cylinder 112 and the other end externally protruded from the housing 114, and is configured to slide within the housing 114.

Such a shaft 116 includes a body 118 configured to have a protrusion part 118a protruded and formed at a specific location of the body 118 and first and second extension units 120, 122 in parallel extended and formed from the body 118 so that they have different lengths.

The first and the second extension units 120, 122 are equipped with incision parts 120a, 122a. A pair of guide projections 120b, 122b is downward slantly protruded and formed on both sides of the incision parts 120a, 122a.

When the shaft 116 slides by the cylinder 112 after the welding tip removal means 110 is moved to the welding gun 10 by the robot arm and the tip of the shank 12 of the welding gun 10 is placed at a welding tip insertion groove 136 formed in the guide unit 130, the pair of guide projections 120b, 122b enables a welding tip 14 combined with the tip of the shank 12 of the welding gun 10 to be removed from the tip of the shank 12.

The clamp 124 is inserted into the incision groove 114a so that the clamp 124 is elastically moved in the height direction of the housing 114 by means of an elastic member 126 provided at a specific location within the housing 112. The clamp 124 is elastically moved in conjunction with the operation of the shaft 116.

In this case, a fitting unit 124a is protruded and formed at the lower part of the clamp 124. The filling unit 124a is placed under the protrusion part 118a that is protruded and formed at a specific location of the body 118 of the shaft 116. The fitting unit 124a is selectively pressurized by the protrusion part 118a when the shaft 116 slides so that the clamp 124 is supplied with the elastic force of the elastic member 126.

Furthermore, a bent unit 124b is bent and formed at the upper part of the clamp 124, and a stopper 124c is protruded and formed at the central part of the clamp 124.

The bent unit 124b selectively closes the welding tip insertion groove 136 formed in the guide unit 130 when the clamp 124 is elastically moved by the elastic member 126 in the height direction of the housing 114, thereby preventing the welding tip 14 removed from the tip of the shank 12 of the welding gun 10 by the welding tip removal means 110 from deviating from the welding tip insertion groove 136.

The stopper 124c is engaged with a protrusion 114b formed at a specific location within the housing 114 when the clamp 124 is elastically moved by the elastic member 126 in the height direction of the housing 114, so that the clamp 124 restricts an elastic movement distance.

The covers 128 is combined with one side of the housing 114 in which the incision groove 114a is formed and is configured to prevent the clamp 124 inserted into the incision groove 114a from deviating from the incision groove 114a.

The guide unit 130 includes a guide body 132 configured to have the bottom combined with a top surface of the housing 114 and to include an insertion unit 132a inserted into the incision part 120a included in the first extension unit 120 and a guide bracket 134 combined with both sides of the guide body 132.

In this case, a welding tip insertion groove 136 is formed at the center of the insertion unit 132a and at the center of the guide bracket 134 corresponding to the insertion unit 132a.

The welding tip mounting means 140 is configured to include a housing 142 combined with one side of the welding tip removal means 110, a cylinder 144 combined with the end of the housing 142, and a finger unit 146 provided within the housing 142 and driven by the cylinder 144.

The finger unit 146 is configured to include a combination tool 148 placed within the housing 142 and configured to have one end combined with the cylinder 144, a connection tool 150 combined with the other end of the combination tool 148 so that one end of the connection tool 150 is rotatably moved, an actuation finger 152 configured to have one end rotatably combined with the other end of the connection tool 150 and to have a central part hinged and combined with a specific location within the housing 142, and a fixation finger 154 combined with a specific location within the housing 142 so that the fixation finger 154 is placed under the actuation finger 152.

Furthermore, a guide groove 142a is formed at a specific location on one side of the housing 142. The combination tool 148 operates in conjunction with the cylinder 144, and is connected to the guide groove 142a through a connection pin (not illustrated) so that the combination tool 148 moves along the guide groove 142a.

That is, when the combination tool 148 moves along the guide groove 142a in conjunction with the operation of the cylinder 144, the actuation finger 152 performs a link work through the medium of the connection tool 150.

The welding tip supply means 160 supplies a welding tip to the welding tip mounting means 140. Such welding tip supply means 160 includes a post frame 162 spaced apart from the welding gun 10 at a specific interval, a body 164 combined with the top of the post frame 162 and configured to include a welding tip accommodation unit 164a and a welding tip input hole 164b, and covers 166 combined with both sides of the body 164.

A welding tip collection tank 163 capable of storing a welding tip removed from the tip of the shank 12 of the welding gun 10 by the welding tip removal means 110 preferably is installed at a specific location in the height direction of the post frame 162.

The welding tip accommodation unit 164a has a shape, such as 'S', 'M', or 'W'. The welding tip accommodation unit 164a preferably has only to be configured so that a welding tip input to the welding tip accommodation unit 164a through the welding tip input hole 164b may move from the top of the welding tip accommodation unit 164a to the bottom due to its own weight.

A miss-input prevention unit 167 is formed on one side of the welding tip input hole 164b. The miss-input prevention unit 167 prevents a welding tip from being input to the welding tip accommodation unit 164a through the welding tip input hole 164b when the input direction of the welding tip supplied to the welding tip accommodation unit 164a through the welding tip input hole 164b is reversed.

Meanwhile, an auxiliary welding tip supply unit 170 for supplying a welding tip to the welding tip supply means 160 is disposed on top of the welding tip supply means 160.

The auxiliary welding tip supply unit 170 is configured to include a body 172 configured to have a welding tip storage unit 172a formed therein in the height direction of the body, an opening 174 formed at a specific location of the body 172 in such a way as to communicate with the welding tip storage unit 172a, an opening and closing lever 178 rotatably combined with an incision part 176 formed in a length direction at the bottom of the body 172 from the opening 174 and configured to open and close the opening 174, and covers 179 combined with both sides of the body 172.

In this case, the welding tip storage unit 172a has a shape, such as 'S', 'M', or 'W'. The welding tip storage unit 172a preferably is configured so that a welding tip input through the opening 174 may move from the top of the welding tip storage unit 172a to the bottom due to its own weight.

Furthermore, a spring 178a is provided between the bottom of the incision part 176 and the opening and closing lever 178. The spring 178a applies elastic force to the opening and closing lever 178 so that the opening and closing lever 178 is elastically and rotatably moved.

Moreover, at least one location setting block 180 is provided at the bottom of the body 172 and is spaced apart from the opening and closing lever 178 at a specific interval. The location setting block 180 provides guidance so that the auxiliary welding tip supply unit 170 is precisely combined with a top surface of the welding tip supply means 160.

That is, when the auxiliary welding tip supply unit 170 is combined with the top surface of the welding tip supply means 160 in order to supply the welding tip accommodation unit 164a of the welding tip supply means 160 with a welding tip received in the welding tip storage unit 172a of the auxiliary welding tip supply unit 170, the location setting block 180 provided at the bottom of the body 172 of the auxiliary welding tip supply unit 170 is seated in a seating groove 168 formed to face the welding tip input hole 164b provided in the body 164 of the welding tip supply means 160. At the same time, the opening and closing lever 178 has one end brought in contact with the top surface of the body 164 of the welding tip supply means 160 and the other end inserted into an accommodation groove 169 formed between the seating groove 168 and the welding tip input hole 164b formed at the top surface of the body 164 of the welding tip supply means 160.

Accordingly, when one end of the opening and closing lever 178 comes in contact with the top surface of the body 164 of the welding tip supply means 160, the other end of the opening and closing lever 178 is inserted into the accommodation groove 169 formed between the seating groove 168 and the welding tip input hole 164b formed at the top surface of the body 164 of the welding tip supply means 160. As a result, the welding tip input hole 164b closed by the opening and closing lever 178 is opened, and thus the welding tip is smoothly supplied from the auxiliary welding tip supply unit 170 to the welding tip supply means 160.

Meanwhile, a bending measuring sensor 190 for checking the bending state of the tip of the shank 12 of the welding gun 10 preferably is installed in at least one of the welding tip removal means 110 and the welding tip mounting means 140.

The bending measuring sensor 190 includes a connection plate 192 combined with at least one of the welding tip removal means 110 and the welding tip mounting means 140, a casing 194 combined with the connection plate 192 and configured to have a hollow at the center of the casing 194 and to have a doughnut shape, a guide 196 installed in the hollow of the casing 194, and a plurality of spring plungers 198 disposed within the casing 194 in a circumference direction, spaced apart from one another at specific intervals, and configured to have one end supported by the end of the guide 196.

Furthermore, a + terminal 195 and a − terminal 197 are provided at specific locations within the casing 194. The + terminal 195 is spaced apart from the guide 196 at a specific interval, and the − terminal 197 is combined with the guide 196.

Accordingly, in a method of checking the bending state of the tip of the shank 12 of the welding gun 10 through the bending measuring sensor 190, the robot arm is driven, and the tip of the shank 12 of the welding gun 10 enters the guide 196. When the guide 196 is brought in contact with the + terminal 195 pressed by the tip of the shank 12 and electrified, it is determined that there is a bend at the tip of the shank 12. If not, it is determined that there is no bend at the tip of the shank 12.

The operation of the apparatus for replacing a welding tip in accordance with an embodiment of the present invention is described below.

First, the opening and closing lever 178 that closes the opening 174 formed to communicate with the welding tip storage unit 172a is rotatably moved so that a welding tip is stored in the welding tip storage unit 172a formed within the body 172 of the auxiliary welding tip supply unit 170 in a height direction. Next, the welding tip is supplied through the opening 174 so that it is stored in the welding tip storage unit 172a. The auxiliary welding tip supply unit 170 is combined with the top of the welding tip supply means 160 so that the welding tip stored in the welding tip storage unit 172a is supplied to the welding tip accommodation unit 164a of the welding tip supply means 160.

Thereafter, the welding tip mounting means 140 is moved to the welding tip supply means 160 so that the welding tip received in the welding tip accommodation unit 164a of the welding tip supply means 160 is grasped by the finger unit 146.

Thereafter, after the welding tip received in the welding tip accommodation unit 164a of the welding tip supply means 160 is grasped by the finger unit 146, the robot arm is driven so that the welding tip removal means 110 removes the welding tip 14 combined with the tip of the shank 12 of the welding gun 10.

In this case, in a process of removing, by the welding tip removal means 110, the welding tip 14 combined with the tip of the shank 12 of the welding gun 10, the welding tip insertion groove 136 formed in the guide unit 130 is placed at the tip of the shank 12 with which the welding tip 14 is combined. Next, when the cylinder 112 is driven so that the shaft 116 slides, the welding tip 14 combined with the tip of the shank 12 is removed from the tip of the shank 12 by the pair of guide projections 120b, 122b that are downward slantly protruded and formed on both sides of the incision parts 120a, 122a provided in the first and the second extension units 120, 122 of the shaft 116.

In this case, the welding tip removed from the tip of the shank 12 is received in the welding tip insertion groove 136 without deviating from the welding tip insertion groove 136 by means of the bent unit 124b bent and formed at the upper part of the clamp 124 that elastically moves in conjunction with the operation of the shaft 116.

Thereafter, after the welding tip is removed from the tip of the shank 12, the welding tip mounting means 140 is moved to the tip of the shank 12 so that the welding tip grasped by the finger unit 146 is inserted into the tip of the shank 12, thereby completing the change of the welding tip.

Thereafter, the welding tip removal means 110 is moved to the welding tip collection tank 163 provided in the post frame 162 of the welding tip supply means 160 so that the welding tip received in the welding tip insertion groove 136 is collected by the welding tip collection tank 163.

Accordingly, the apparatus for replacing a welding tip in accordance with an embodiment of the present invention have advantages in that workability and productivity can be improved and a safety accident can be prevented because the welding tip of a spot welding gun can be automatically replaced.

Although the preferred embodiments of the present invention have been described above, those skilled in the art will appreciate that the present invention may be modified and changed in various ways without departing from the technical spirit and scope of the present invention.

INDUSTRIAL APPLICABILITY

The present invention is directed to an apparatus for replacing the welding tip of a spot welding gun, and may be used for an apparatus for replacing the welding tip of a spot welding gun, which is capable of automatically replacing the welding tip of the spot welding gun.

What is claimed is:

1. An apparatus configured to replace a welding tip of a welding gun installed on a ground, the apparatus comprising:
   welding tip removal means for removing the welding tip from the welding gun and combined with a robot arm;
   welding tip mounting means for mounting the welding tip to the welding gun and combined with one side of the welding tip removal means; and
   welding tip supply means spaced apart from the welding gun at a specific distance and configured to supply a welding tip to the welding tip mounting means.

2. The apparatus of claim 1, wherein the welding tip removal means is configured to comprise:
   a cylinder combined with one side of the robot arm;
   a housing combined with a top of the cylinder and configured to have an incision groove formed on one side in a length direction of the housing;
   a shaft configured to have one end combined with the cylinder and another end externally protruded from the housing in such a way as to slide within the housing and said shaft configured to comprise a body configured to have a protrusion part protruded from and formed at a specific location of the body, and said body configured to have first and second extension units extended from the body and formed in parallel in a manner so that each of the first and second extension units has a different length and has a respective incision part;
   a clamp inserted into the incision groove so that the clamp is elastically moved in a height direction of the housing by an elastic member provided at a specific location within the housing;
   a cover combined with one side of the housing, in which side of the housing the incision groove is formed, the cover configured so that the clamp does not deviate from the incision groove; and
   a guide unit configured to comprise a guide body configured to have a bottom combined with a top surface of the housing and to comprise an insertion unit inserted into the incision part included in the first extension unit and to comprise a guide bracket combined with sides of the guide body,
   wherein a welding tip insertion groove is formed at a center of the insertion unit and at a center of the guide bracket.

3. The apparatus of claim 2, wherein each of the incision parts is provided with a respective pair of guide projections.

4. The apparatus of claim 3, wherein:
   a fitting unit is protruded and formed at a lower part of the clamp, and
   the protrusion part selectively presses the fitting unit when the shaft slides so that elastic force is applied to the clamp by the elastic member.

5. The apparatus of claim 1, wherein the welding tip mounting means is configured to comprise:
   a housing combined with one side of the welding tip removal means;
   a cylinder combined with an end of the housing; and
   a finger unit provided within the housing and driven by the cylinder.

6. The apparatus of claim 5, wherein the finger unit is configured to comprise:
   a combination tool having one end and an other end and placed within the housing and configured to have the one end combined with the cylinder;
   a connection tool, having one end and an other end, said one end of which is rotatably combined with the other end of the combination tool;
   an actuation finger configured to have one end rotatably combined with the other end of the connection tool and to have a central part hinged and combined with a specific location within the housing; and
   a fixation finger combined with a specific location within the housing so that the fixation finger is placed under the actuation finger.

7. The apparatus of claim 6, wherein:
   a guide groove is formed at a specific location on one side of the housing, and
   the combination tool moves along the guide groove in conjunction with an operation of the cylinder.

8. The apparatus of claim 1, wherein:
   the welding tip supply means comprises a post frame spaced apart from the welding gun at a specific distance, a body combined with a top of the post frame and configured to comprise a welding tip accommodation unit and a welding tip input hole, and covers combined with two sides of the body, and
   a welding tip collection tank is installed at a specific location in a height direction of the post frame.

9. The apparatus of claim 8, wherein formed on one side of the welding tip input hole is a miss-input prevention unit for preventing the welding tip from being input to the welding tip accommodation unit through the welding tip input hole when an input direction of the welding tip supplied to the welding tip accommodation unit through the welding tip input hole is reversed with respect to a desired input direction of the welding tip.

10. The apparatus of claim 1, wherein:
an auxiliary welding tip supply unit for supplying a welding tip to the welding tip supply means is disposed on top of the welding tip supply means, and
the auxiliary welding tip supply unit is configured to comprise
a body configured to have a welding tip storage unit formed in the body in a height direction,
an opening formed at a specific location of the body in such a way as to communicate with the welding tip storage unit,
an opening and closing lever rotatably combined with an incision part formed in a length direction of the body at the bottom of the body and configured to open and close the opening, and
covers combined with two sides of the body.

11. The apparatus of claim 1, wherein a bending measuring sensor for checking a bending state of a tip of a shank of the welding gun is installed in at least one of the welding tip removal means and the welding tip mounting means.

* * * * *